US012155976B2

(12) United States Patent
van Voorst Vader et al.

(10) Patent No.: US 12,155,976 B2
(45) Date of Patent: Nov. 26, 2024

(54) PROJECTOR WITH LOCAL DIMMING

(71) Applicant: Lumileds LLC, San Jose, CA (US)

(72) Inventors: Pieter Johannes Quintus van Voorst Vader, Son (NL); Arjen Gerben Van der Sijde, Eindhoven (NL); Nicola Bettina Pfeffer, Eindhoven (NL)

(73) Assignee: Lumileds LLC, San Jose, CA (US)

(*) Notice: Subject to any disclaimer, the term of this patent is extended or adjusted under 35 U.S.C. 154(b) by 149 days.

(21) Appl. No.: 17/991,712

(22) Filed: Nov. 21, 2022

(65) Prior Publication Data

US 2023/0171383 A1 Jun. 1, 2023

Related U.S. Application Data

(60) Provisional application No. 63/283,609, filed on Nov. 29, 2021.

(51) Int. Cl.
*H04N 9/31* (2006.01)
*G03B 21/00* (2006.01)
(Continued)

(52) U.S. Cl.
CPC ......... *H04N 9/3155* (2013.01); *G03B 21/006* (2013.01); *G03B 21/2013* (2013.01);
(Continued)

(58) Field of Classification Search
CPC .. H04N 9/3155; H04N 9/3138; H04N 9/3167; H04N 9/3158; H04N 9/3194;
(Continued)

(56) References Cited

U.S. PATENT DOCUMENTS 5,278,681 A * 1/1994 Gitlin ................... H04N 9/3108
349/33
5,315,418 A * 5/1994 Sprague .............. G02F 1/13473
349/8
(Continued)

FOREIGN PATENT DOCUMENTS

WO 2023096874 A1 6/2023

OTHER PUBLICATIONS

"International Application Serial No. PCT/US2022/050633, International Search Report mailed Apr. 7, 2023", 12 pgs.
(Continued)

*Primary Examiner* — Michael B. Pierorazio
(74) *Attorney, Agent, or Firm* — Schwegman, Lundberg & Woessner, P.A.

(57) ABSTRACT

A projection system can include a housing. A controller can receive a video signal and, in response to the video signal, produce a light-emitting diode (LED) array-controlling signal and a modulation panel-controlling signal. An LED array disposed in the housing can include LEDs that are configured to produce LED light having corresponding time-varying intensities in response to the LED array-controlling signal. A modulation panel disposed in the housing can have a plurality of pixels that are configured to modulate corresponding portions of the LED light in response to the modulation panel-controlling signal to form intensity-modulated light. A lens disposed in or on the housing can project the intensity-modulated light out of the housing to form a video image that corresponds to the video signal. The video image can be located away from the housing.

17 Claims, 6 Drawing Sheets

(51) Int. Cl.
*G03B 21/20* (2006.01)
*G03B 21/28* (2006.01)

(52) U.S. Cl.
CPC ......... *G03B 21/2033* (2013.01); *G03B 21/28* (2013.01); *H04N 9/3138* (2013.01); *H04N 9/3167* (2013.01)

(58) Field of Classification Search
CPC .. H04N 9/3105; H04N 9/3164; G03B 21/006; G03B 21/2013; G03B 21/2033; G03B 21/28
See application file for complete search history.

(56) References Cited

U.S. PATENT DOCUMENTS

| | | | | |
|---|---|---|---|---|
| 7,068,789 B2* | 6/2006 | Huitema | ............... | H04L 67/104 713/168 |
| 7,614,069 B2* | 11/2009 | Stone | ............... | H04N 21/25435 725/89 |
| 7,650,624 B2* | 1/2010 | Barsoum | ............... | H04N 7/081 725/23 |
| 7,721,313 B2* | 5/2010 | Barrett | ............... | H04N 21/4334 725/89 |
| 7,813,822 B1* | 10/2010 | Hoffberg | ............... | H04N 7/163 381/73.1 |
| 8,032,911 B2* | 10/2011 | Ohkita | ............... | H04L 61/5038 725/74 |
| 8,121,706 B2* | 2/2012 | Morikawa | ........... | H04L 12/2814 725/74 |
| 8,949,923 B2* | 2/2015 | Muvavarirwa | .... | H04N 21/4108 370/332 |
| 10,197,971 B1* | 2/2019 | Horst | ................... | G11C 13/044 |
| 2002/0015305 A1* | 2/2002 | Bornhorst | ......... | G02F 1/133385 362/264 |
| 2003/0056093 A1* | 3/2003 | Huitema | ............... | H04L 67/104 713/156 |
| 2004/0117856 A1* | 6/2004 | Barsoum | ........... | G06Q 30/0207 348/E7.071 |
| 2005/0216942 A1* | 9/2005 | Barton | ............... | H04N 21/6125 348/E7.071 |
| 2005/0283815 A1* | 12/2005 | Brooks | ................... | H04H 20/78 725/127 |
| 2005/0289632 A1* | 12/2005 | Brooks | ............. | H04N 7/17309 725/127 |
| 2006/0010481 A1* | 1/2006 | Wall | ........................ | H04N 7/163 725/151 |
| 2006/0212197 A1* | 9/2006 | Butler | ................. | B60R 11/0235 701/1 |
| 2006/0225105 A1* | 10/2006 | Russ | ................. | H04N 7/17318 348/E7.071 |
| 2007/0050822 A1* | 3/2007 | Stevens | .................... | H04N 7/14 725/74 |
| 2007/0079341 A1* | 4/2007 | Russ | ................. | H04N 21/43615 725/89 |
| 2007/0101185 A1* | 5/2007 | Ostrowka | .......... | H04N 21/4334 714/6.13 |
| 2007/0130601 A1* | 6/2007 | Li | ........................ | H04L 65/611 725/112 |
| 2007/0157281 A1* | 7/2007 | Ellis | ................... | H04N 21/4147 725/74 |
| 2008/0013919 A1* | 1/2008 | Boston | ................... | G11B 19/00 |
| 2008/0022330 A1* | 1/2008 | Barrett | ............... | H04N 21/8352 725/89 |
| 2008/0022331 A1* | 1/2008 | Barrett | ............... | H04N 21/6125 725/89 |
| 2008/0022332 A1* | 1/2008 | Barrett | ............... | H04N 21/4227 725/89 |
| 2008/0155615 A1* | 6/2008 | Craner | ............... | H04N 7/17318 348/E7.071 |
| 2008/0221734 A1* | 9/2008 | Nagao | ..................... | G06V 10/56 706/20 |
| 2008/0235587 A1* | 9/2008 | Heie | ....................... | H04N 7/142 709/231 |
| 2008/0235733 A1* | 9/2008 | Heie | ..................... | H04N 21/482 725/46 |
| 2009/0091713 A1* | 4/2009 | Shirai | ..................... | G09G 3/002 359/291 |
| 2009/0162032 A1* | 6/2009 | Patel | ................... | H04N 21/8355 386/353 |
| 2010/0107186 A1* | 4/2010 | Varriale | ................. | H04H 60/23 455/410 |
| 2010/0125876 A1* | 5/2010 | Craner | ............... | H04N 21/4331 725/37 |
| 2010/0263013 A1* | 10/2010 | Asakura | ............... | H04N 21/443 725/116 |
| 2010/0296487 A1* | 11/2010 | Karaoguz | ............... | H04W 36/04 370/332 |
| 2010/0313225 A1* | 12/2010 | Cholas | ............... | H04N 21/4402 725/62 |
| 2010/0313226 A1* | 12/2010 | Cholas | ............. | H04N 21/25875 725/98 |
| 2011/0066744 A1* | 3/2011 | Del Sordo | ......... | H04N 21/4305 709/231 |
| 2011/0086619 A1* | 4/2011 | George | ............. | H04M 1/72415 455/414.1 |
| 2011/0103374 A1* | 5/2011 | Lajoie | ................... | H04L 65/612 370/352 |
| 2011/0107364 A1* | 5/2011 | Lajoie | ................. | H04L 65/1023 370/352 |
| 2011/0107379 A1* | 5/2011 | Lajoie | ................... | H04L 65/611 725/151 |
| 2011/0191810 A1* | 8/2011 | Thomas | ................. | H04N 7/106 725/78 |
| 2012/0230649 A1* | 9/2012 | Craner | ............... | H04N 21/4424 386/230 |
| 2012/0327139 A1* | 12/2012 | Margulis | ............... | H04N 9/312 345/690 |
| 2013/0198787 A1* | 8/2013 | Perry, II | ............. | H04N 21/2585 725/86 |
| 2013/0215334 A1* | 8/2013 | Matoba | ................ | H04N 9/3155 348/760 |
| 2017/0109584 A1* | 4/2017 | Yao | ..................... | H04N 21/4666 |
| 2017/0254932 A1* | 9/2017 | Huang | ..................... | G02F 1/21 |
| 2018/0039169 A1* | 2/2018 | Whitehead | ........... | H04N 9/3126 |
| 2018/0150704 A1* | 5/2018 | Lee | ........................ | G06V 20/58 |
| 2019/0108618 A1* | 4/2019 | Hwang | ..................... | G06N 3/08 |
| 2019/0222891 A1* | 7/2019 | Shen | ................. | H04N 21/25875 |
| 2020/0073152 A1* | 3/2020 | Whitehead | ............... | G09G 3/32 |
| 2020/0196024 A1* | 6/2020 | Hwang | ................... | H04N 21/2353 |
| 2020/0209722 A1* | 7/2020 | Xu | ..................... | G02F 1/133385 |
| 2020/0211229 A1* | 7/2020 | Hwang | ................... | G06N 20/00 |
| 2021/0302756 A1* | 9/2021 | Makinen | ................. | G02B 30/10 |
| 2021/0326690 A1* | 10/2021 | Pégard | ............... | G06N 3/0675 |
| 2023/0043791 A1* | 2/2023 | Supikov | ............... | G03H 1/0866 |
| 2023/0205133 A1* | 6/2023 | Matusik | ................ | G03H 1/04 359/9 |
| 2023/0368012 A1* | 11/2023 | Yu | ........................... | G02B 5/18 |

OTHER PUBLICATIONS

"International Application Serial No. PCT/US2022/050633, Written Opinion mailed Apr. 7, 2023", 4 pgs.
"International Application Serial No. PCT/US2022/050633, International Preliminary Report on Patentability mailed Jun. 13, 2024", 6 pgs.

* cited by examiner

PROJECTOR WITH LOCAL DIMMING

CROSS-REFERENCE TO RELATED APPLICATION

This application claims the benefit of U.S. Provisional Application No. 63/283,609, filed on Nov. 29, 2021, the entirety of which is hereby incorporated by reference herein.

FIELD OF THE DISCLOSURE

The present disclosure relates to a projection system, such as for a video image.

BACKGROUND OF THE DISCLOSURE

There is ongoing effort to improve projection systems, such as for video images.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

In an example, a projection system can include a housing. A controller can receive a video signal and, in response to the video signal, produce a light-emitting diode (LED) array-controlling signal and a modulation panel-controlling signal. An LED array disposed in the housing can include LEDs that are configured to produce LED light having corresponding time-varying intensities in response to the LED array-controlling signal. A modulation panel disposed in the housing can have a plurality of pixels that are configured to modulate corresponding portions of the LED light in response to the modulation panel-controlling signal to form intensity-modulated light. A lens disposed in or on the housing can project the intensity-modulated light out of the housing to form a video image that corresponds to the video signal. The video image can be located away from the housing. Because the controller can locally dim the LED array (e.g., by dynamically varying outputs of the LEDs in response to regions of the video signal), the projection system can have an increased contrast and can use less power than a comparable system that operates an LED array at a time-invariant full power.

In all of the examples that follow, a semiconductor-based emitter can be used in place of an LED. For example, a semiconductor-based laser diode can be used, such as in an array of semiconductor-based laser diode. As another example, a vertical-cavity surface-emitting laser (VCSEL) can be used, such as in an array of VCSELs. As another example, an edge-emitting laser (EEL) can be used, such as in an array of EELs. The semiconductor-based emitter can produce light of suitable colors, such as red light, green light, blue light, or others. For simplicity, the discussion that follows uses the term LED, and it will be understood that laser can alternatively be used in any or all instances of the term LED.

Figure 1:
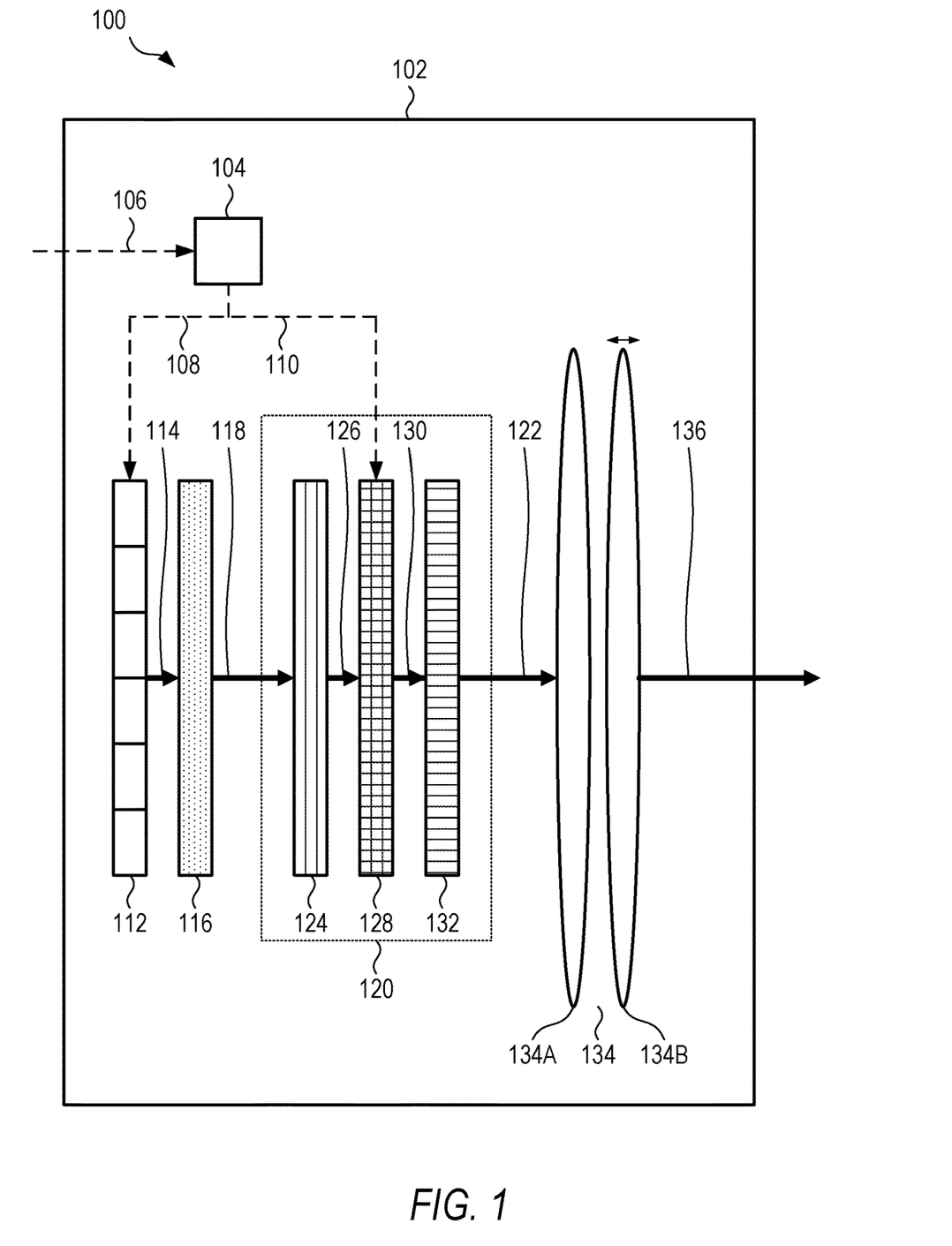
FIG. 1 shows a side view of an example of a projection system, in accordance with some examples.

FIG. 1 shows a side view of an example of a projection system 100, in accordance with some examples.

The projection system 100 can include a housing 102. In some examples, the housing 102 can include at least a portion of a mobile device, such as a smart phone. In some examples, the housing 102 can be formed as an external housing of a projector. Other suitable configurations can also be used.

The projection system 100 can include a controller 104. The controller 104 can include one or more processors. The controller 104 can include memory for storing instructions that, when executed by the one or more processors, cause the one or more processors to receive a video signal 106. The video signal 106 can be received wirelessly or via a wired connection to one or more servers or other local or remote devices capable of providing the video signal 106. In response to the video signal 106, the controller 104 can produce a light-emitting diode (LED) array-controlling signal 108 and a modulation panel-controlling signal 110. The modulation panel-controlling signal 110 can include intensity information for each pixel of a video image, for each frame of the video signal 106. The LED array-controlling signal 108 can include intensity information for subsets or groups of pixels of the video image, such as for regions within the video image. For example, the LED array-controlling signal 108 can determine how much light is used to form a region of the video image, and the modulation panel-controlling signal 110 can determine how to modulate the light to form the pixel-by-pixel video within the region. As a specific example, if the video image includes a dark (e.g., a zero-intensity) border around a perimeter of the video image, then the LED array-controlling signal 108 can indicate a zero or relatively small intensity for regions in the perimeter, while the modulation panel-controlling signal 110 can further modulate the zero or relatively small intensity to produce the pixel-by-pixel intensity of the video image. In other words, the controller 104 can control both how much light is produced (across the video image) and how much light is modulated (also across the video image). Compared to a projection system in which the amount of light produced is maintained at a fixed (e.g., relatively high) value, the projection system 100 can have a higher contrast and a higher dynamic range (especially at low intensities). For example, for video frames that are completely dark (e.g., zero intensity), the projection system 100 can reduce the LED output to zero, which can provide an effectively infinite contrast. Compared with systems that maintain a fixed LED output level and rely on a modulation panel 120 to reduce the intensity, the projection system 100 can overcome losses in contrast that may arise from spurious leakage through the modulation panel 120.

The projection system 100 can include an LED array 112 disposed in the housing 102. The LED array 112 can include LEDs that can produce LED light 114 having corresponding time-varying intensities in response to the LED array-controlling signal 108. In some examples, the LEDs of the LED array 112 can be disposed on a single substrate. For example, the LEDs can be formed as a monolithic, segmented light-emitting diode, with individually addressable and/or individually powerable segments of the segmented light-emitting diode. As another example, the LEDs can be formed as individual light-emitting diodes on the substrate, which can be individually addressable and/or individually powerable. In some examples, the LED array 112 can optionally be covered by a wavelength converting layer, such as a phosphor. The LED array 112 can produce first light having a first wavelength, such as in the blue or violet portion of the visible spectrum. The wavelength converting layer can absorb some or all of the first light and emit second light having a second wavelength that is greater than the first wavelength, such as in the yellow portion of the visible spectrum. The full light output can be the second light, or a combination of the first light and the second light. In some examples, the phosphor and the geometry of the LED array 112 can be tailored to output light having a specified peak wavelength and/or a specified wavelength spectrum. Alternatively, the LED array 112 can include a multi-layer structure that can produce multiple wavelengths of light, such as a three-layer stack that emits red light, green light, and blue light.

The projection system 100 can include an optional diffuser 116 disposed in the housing 102. The diffuser 116 can increase a spatial uniformity of the LED light 114, such as by effectively filling in gaps between adjacent LEDs in the LED array 112. The diffuser 116 can angularly broaden the LED light 114, such as to produce diffuse LED light 118. In some examples, the diffuser 116 can angularly broaden the LED light 114 via scattering from particles in the diffuser 116. In some examples, the diffuser 116 can include a base material. In some examples, the diffuser 116 can include relatively small particles suspended in the base material and having a refractive index that differs slightly from a refractive index of the base material. The diffuser 116 can change the path of light rays via refraction at interfaces between the small particles and the base material. This is but one example of a diffuser 116; other suitable diffusers can also be used.

The projection system 100 can include a modulation panel 120 disposed in the housing 102. The modulation panel 120 can have a plurality of pixels that can modulate corresponding portions of the LED light 114 or the diffuse LED light 118 in response to the modulation panel-controlling signal 110 to form intensity-modulated light 122.

In some examples, the modulation panel 120 can include a first polarizer 124 disposed in the housing 102. The first polarizer 124 can pass a single polarization component of the LED light 114 or the diffuse LED light 118 to form polarized light 126.

Because the LED light 114 or the diffuse LED light 118 may be unpolarized, passage through the first polarizer 124 can result in loss of about half of the optical power of the LED light 114 or the diffuse LED light 118. To reduce the loss of half of the optical power, the projection system 100 can optionally include a polarizing reflector near the LED array 112. The polarizing reflector can transmit light having a first polarization state, such as a state that matches the pass axis of the first polarizer 124, and reflect light having a second polarization state that is orthogonal to the first polarization state. The reflected light can return to the LED array 112 to be recycled, such as by reflecting one or more times inside an LED die in the LED array 112 and being re-emitted with a polarization state that aligns with the first polarization state. In some examples, such a polarizing reflector near the LED array 112 can optionally replace the first polarizer 124.

In some examples, the modulation panel 120 can include a liquid crystal panel 128 disposed in the housing 102. The liquid crystal panel 128 can have a plurality of pixels that can controllably alter corresponding states of polarization of corresponding portions of the polarized light 126 in response to the modulation panel-controlling signal 110 to form polarization-modulated light 130.

In some examples, the modulation panel 120 can include a second polarizer 132 disposed in the housing 102. The second polarizer 132 can pass a single polarization component of the polarization-modulated light 130 to form the intensity-modulated light 122. In some examples, the first polarizer 124 and the second polarizer 132 can have polarization pass axes that are parallel. In some examples, the first polarizer 124 and the second polarizer 132 can have polarization pass axes that are orthogonal. The first polarizer 124, the liquid crystal panel 128, and the second polarizer 132 form but one example of a modulation panel 120; other suitable modulation panels can also be used.

In some examples, the modulation panel 120 can be color-neutral, such as for black-and-white or monochrome video. In other examples, the modulation panel 120 can include wavelength-specific filters that can color light as it passes through the modulation panel 120. For example, each pixel can include a red filter, a green filter, or a blue filter, such that light that passes through the pixel can have a spectrum that is filtered to pass only red light, green light, or blue light. The pixels can be arranged in clusters, such that each cluster includes one red pixel, one green pixel, and one blue pixel. Each cluster of pixels can form a respective portion, or full-color pixel, of a color video image.

Figure 5:
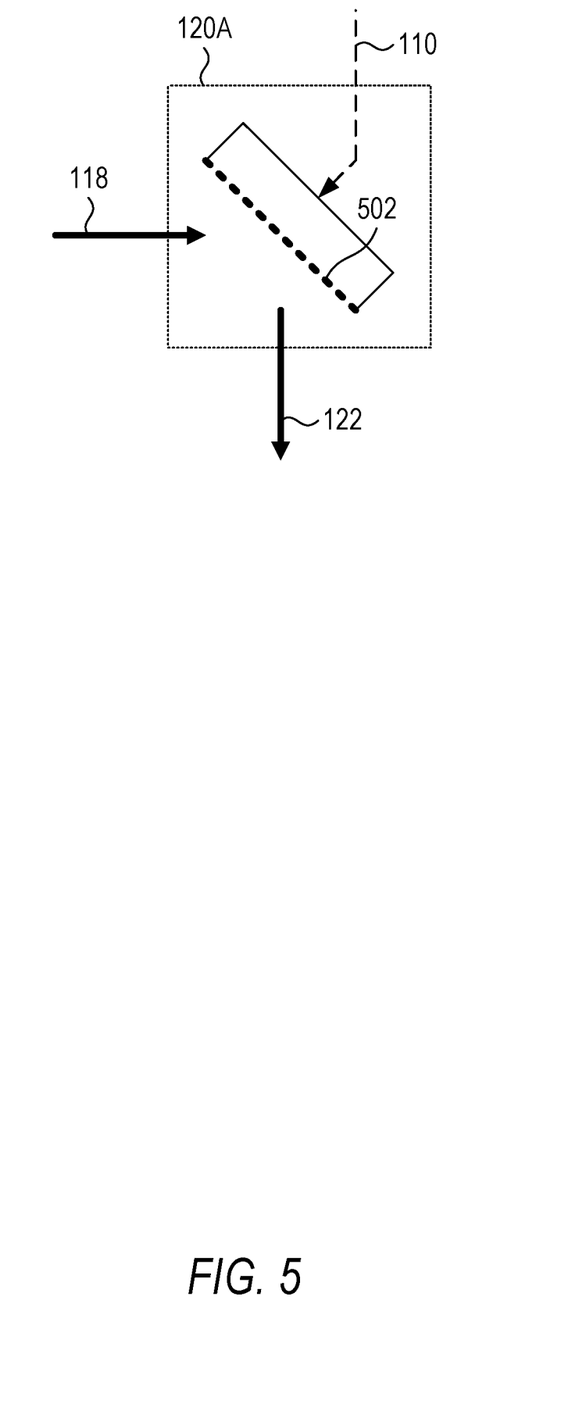
FIG. 5 shows a side view of an example of an alternative modulation panel for the projection system of FIG. 1.

FIG. 5 shows a side view of an example of an alternative modulation panel 120A for the projection system 100 of FIG. 1. As an alternative to the first polarizer 124, the liquid crystal panel 128, and the second polarizer 132, the modulation panel 120A can instead include an array of micromirrors 502. The micromirrors 502 can be individually controlled and/or individually addressed by the controller 104, via the modulation panel-controlling signal 110. The controller 104 can cause each micromirror 502 to switch between a first position, at which light, from the diffuse LED light 118, at a particular pixel location can be directed, as the intensity-modulated light 122, toward the lens 134 for projection, and a second position, at which light at the pixel location can be directed to another location, such as for absorption or for direction away from the light that is to be projected.

Returning to FIG. 1, a lens 134 can be disposed in, adjacent to, near, or on the housing 102. For the purposes of this document, the phrase "on the housing" can include "wholly or partially within the housing". The lens 134 can project the intensity-modulated light 122 out of the housing 102, as projected light 136, to form a video image that corresponds to the video signal 106. The video image can be located away from the housing 102, such as on a remote viewing screen in a theater, a remote wall of a conference room, a viewing screen on a virtual reality headset or an augmented reality headset, or other suitable locations.

The lens 134 can include multiple elements, one or more of which can be longitudinally positioned by a user to bring light into focus at a particular target. The multiple elements can optionally be located so that two or more of the elements are not directly adjacent to each other (e.g., by including an additional optical element between the lens elements). For simplicity, the lens 134 is shown as having two elements, one of which is positionable, but it will be understood that more than two elements can also be used. In some examples, the lens 134 can include a first lens element 134A and a second lens element 134B, which are spaced apart by a user-adjustable spacing to bring the video image into focus at a specified target. For example, the first lens element 134A (or second lens element 134B) can be fixed with respect to the housing 102, while the second lens element 134B (or first lens element 134A) can be positioned by a user, such as by rotating a lever or a lens barrel. The example of FIG. 1 shows the first lens element 134A and the second lens element 134B as both being bi-convex, but either or both of the first lens element 134A and the second lens element 134B can alternatively be plano-convex or meniscus-shaped (e.g., with one convex side and one concave side). During positioning, the user can visually monitor a sharpness of the video image and can adjust the positionable lens element to raise or maximize the sharpness at the specified target. In some examples, the projection system 100 can optionally include an auto-focus mechanism that can automatically adjust a position of one of the lens elements to raise or maximize the sharpness at the specified target. Other configurations can also be used.

It is instructive to discuss how the LEDs of the LED array 112 relate to the pixels of the modulation panel 120 (or, in some examples, the pixels of the liquid crystal panel 128).

In some examples, a number of pixels in the plurality of pixels can be greater than a number of LEDs in the LED array 112. As a specific example, the modulation panel 120 can include 3840 pixels in a first dimension and 2160 pixels in a second dimension, while the LED array 112 can include 7 LEDs in the first dimension and 7 LEDs in the second dimension. This is but one numerical example; other numerical values can also be used.

The controller 104 can tailor how much light each LED produces, as a function of the relative brightness of the video image in a corresponding region of the video image. In some examples, the LED array-controlling signal 108 can average the video signal 106 over the subset of pixels. In some examples, the LED array-controlling signal 108 of each LED can have an intensity value that corresponds to a maximum intensity value of the modulation panel-controlling signal 110 for the corresponding subset of pixels. Other light-tailoring schemes can also be used.

Further, the projection system 100 can optionally correct for systematic limitations of the lens 134, such as a decrease in intensity or brightness near the edges of a field of view of the lens 134. In addition, the projection system 100 can optionally add a local boost factor, which can increase a brightness in one or more locations in the field of view. Such a local boost factor can be beneficial for cases where total electrical power can be limited, such as for mobile devices and/or battery-powered devices, or thermally limited devices in which some or all of the LED array 112 can temporarily be driven past a steady-state maximum current or voltage value.

Figure 2:
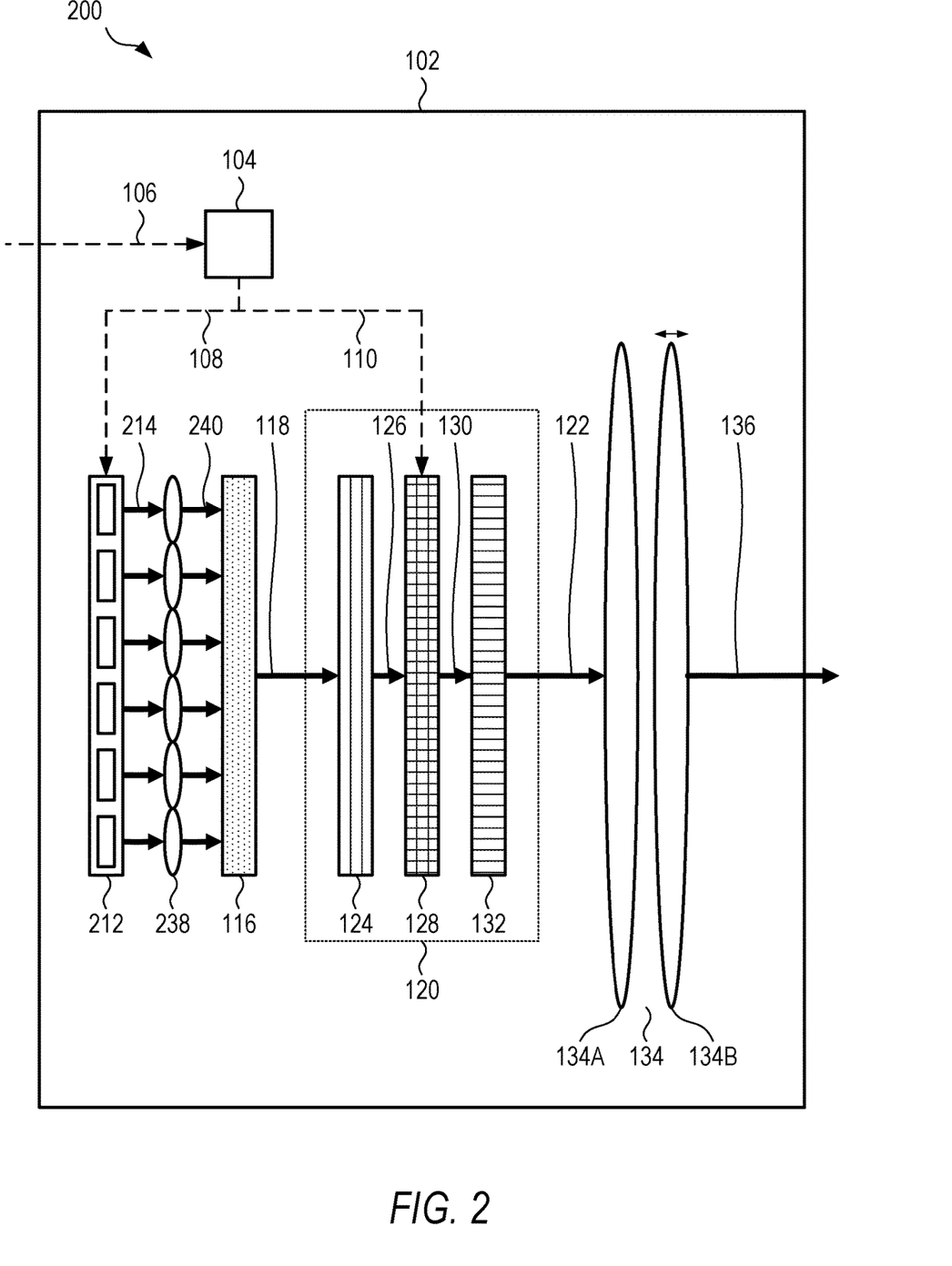
FIG. 2 shows a side view of an example of a projection system, in accordance with some examples.

Light originating from a particular LED may reach only a subset of pixels of the plurality of pixels of the modulation panel 120 (as opposed to light from a single LED arriving at all of the pixels of the modulation panel 120). In some examples, each LED in the LED array 112 can correspond to a subset of pixels of the plurality of pixels. In some examples, the subsets can be mutually exclusive. In some examples, adjacent subsets can overlap at edges of the adjacent subsets. Such overlap can be caused by light exiting the LED array 112 at a relatively large angle of exitance, with respect to a surface normal of the LED array 112. This light can exit one LED and arrive at the modulation panel 120 at a pixel that is closest to another LED. The amount of such overlap can depend on the geometry of the optical elements, including a spacing between the LED array 112 and the modulation panel 120. FIG. 2 shows a configuration that can reduce the amount of overlap, such as by narrowing the angular output from the LEDs of the LED array 112.

FIG. 2 shows a side view of an example of a projection system 200, in accordance with some examples. Compared with the projection system 100 of FIG. 1, the projection system 200 additionally includes a lens array 238, which can at least partially focus the LED light 214 from the LED array 212 to form at least partially focused LED light 240. The lens array 238 can reduce an angular divergence of the LED light 214 from the LED array 212, which can reduce a spread of the LED light 214 as the LED light 214 propagates to the diffuser 116 or to the modulation panel 120. Reducing the angular spread of the LED light 214 can help reduce crosstalk at pixels of the modulation panel 120, such as by ensuring that light at a particular pixel originates from only one LED or only two adjacent LEDs of the LED array 212. Reducing crosstalk in this manner can improve the light-tailoring scheme discussed above.

In some examples, the lens array 238 can include lenses in a one-to-one correspondence with the LEDs of the LED array 212. In some examples, the lens array 238 can collimate or substantially collimate the LED light 214 from the LED array 212. In some examples, the LEDs of the LED array 212 can be disposed on separate substrates. In some examples, the LEDs of the LED array 212 can be disposed a single substrate.

Figure 3:
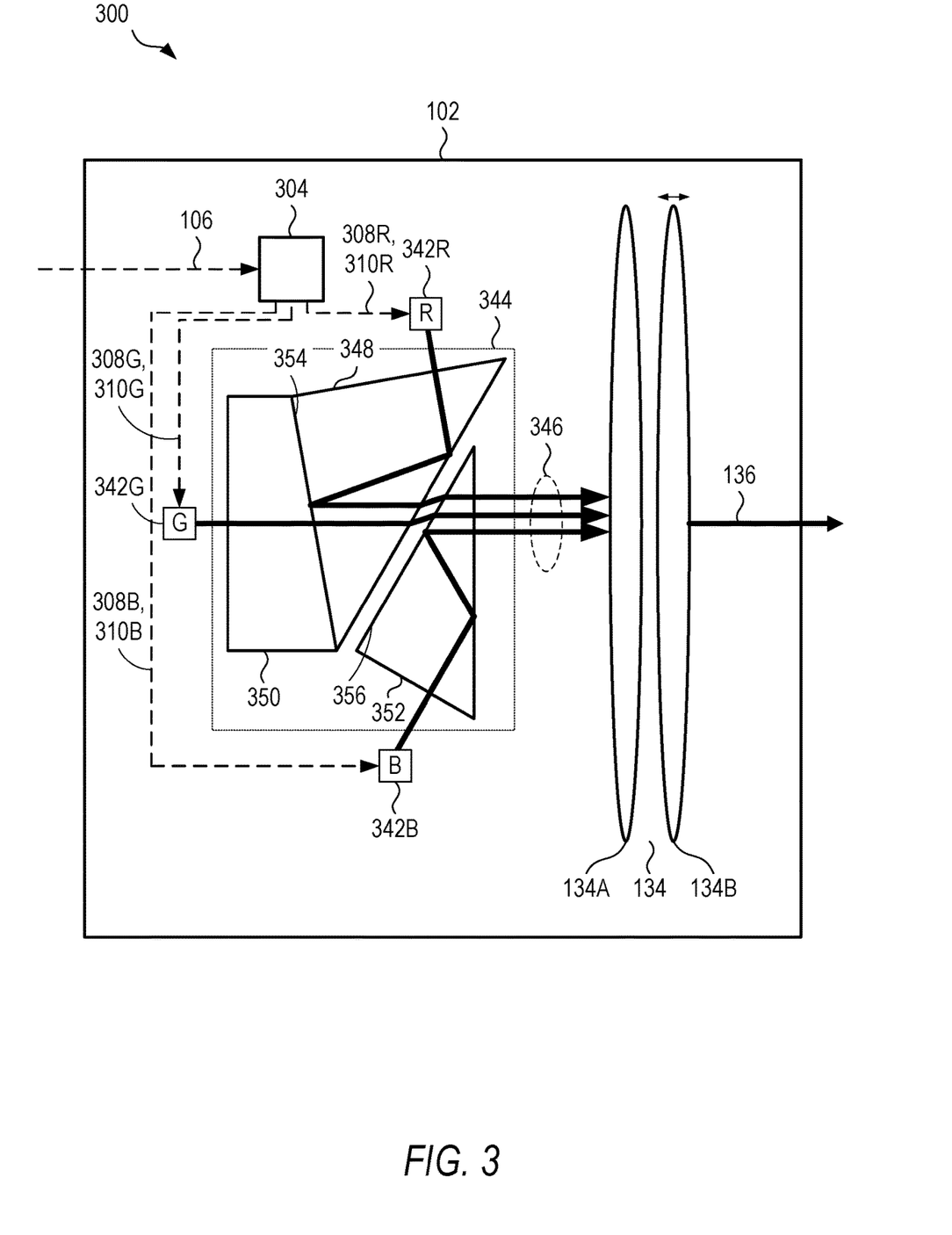
FIG. 3 shows a side view of an example of a projection system, in accordance with some examples.

FIG. 3 shows a side view of an example of a projection system 300, in accordance with some examples. Compared with the projection system 100 and the projection system 200, the projection system 300 decomposes the video signal into color components, such as red, green, and blue, generates intensity-modulated light for each of the color components, combines the intensity-modulated light into a single multi-color beam, then projects the multi-color beam away from the housing 102 to form a video image that corresponds to the video signal.

Beam-producing elements 342R, 342G, and 342B each include an LED array, an optional lens array, an optional diffuser, and a modulation panel, but are shown as being singular elements in FIG. 3 for clarity. In some examples, the LED array of beam-producing element 342R produces red light, the LED array of beam-producing element 342G produces green light, and the LED array of beam-producing element 342B produces blue light, although other suitable colors, wavelengths, or wavelength bands can also be used.

The projection system 300 can include a controller 304. The controller 304 can receive the video signal 106. The controller 304 can produce wavelength-specific LED array-controlling signals 308R, 308G, and 308B for the corresponding beam-producing elements 342R, 342G, and 342B, in response to the video signal 106. The controller 304 can produce wavelength-specific modulation panel-controlling signals 310R, 310G, and 310B for the corresponding beam-producing elements 342R, 342G, and 342B, in response to the video signal 106.

The projection system 300 can include a beam combiner 344. The beam combiner 344 can combine the various wavelength-specific intensity-modulated light to produce wavelength-combined intensity-modulated light 346. FIG. 3 shows a specific example of a beam combiner 344, which includes three prisms 348, 350, and 352, and two dichroic (or wavelength-specific) coatings 354 and 356 disposed on various faces of the prisms. In the example of FIG. 3, red light from beam-producing element 342R enters a first prism 348, reflects via total internal reflection from an uncoated surface of the first prism 348, reflects from a dichroic coating 354 (which reflects red light but transmits green light), exits the first prism 348 through the uncoated surface, passes through a dichroic coating 356 (which transmits red and green light but reflects blue light) on a surface of the third prism 352, and finally exits the third prism 352 through an uncoated surface of the third prism 352 to form a red component of the wavelength-combined intensity-modulated light 346. In the example of FIG. 3, green light from beam-producing element 342G enters a second prism 350, transmits through dichroic coating 354 to enter the first prism 348, exits the first prism 348 through the uncoated surface, passes through the dichroic coating 356 on the surface of the third prism 352, and finally exits the third prism 352 through the uncoated surface of the third prism 352 to form a green component of the wavelength-combined intensity-modulated light 346. In the example of FIG. 3, blue light from beam-producing element 342B enters the third prism 352, reflects via total internal reflection from an uncoated surface of the third prism 352, reflects from the dichroic coating 356, and finally exits the third prism 352 through the uncoated surface of the third prism 352 to form a blue component of the wavelength-combined intensity-modulated light 346. Other configurations are possible, including configurations in which at least one of the coatings absorbs light at one or more specified wavelengths.

The lens 134 can project the wavelength-combined intensity-modulated light 346 out of the housing 102, as projected light 136, to form the video image.

Figure 4:
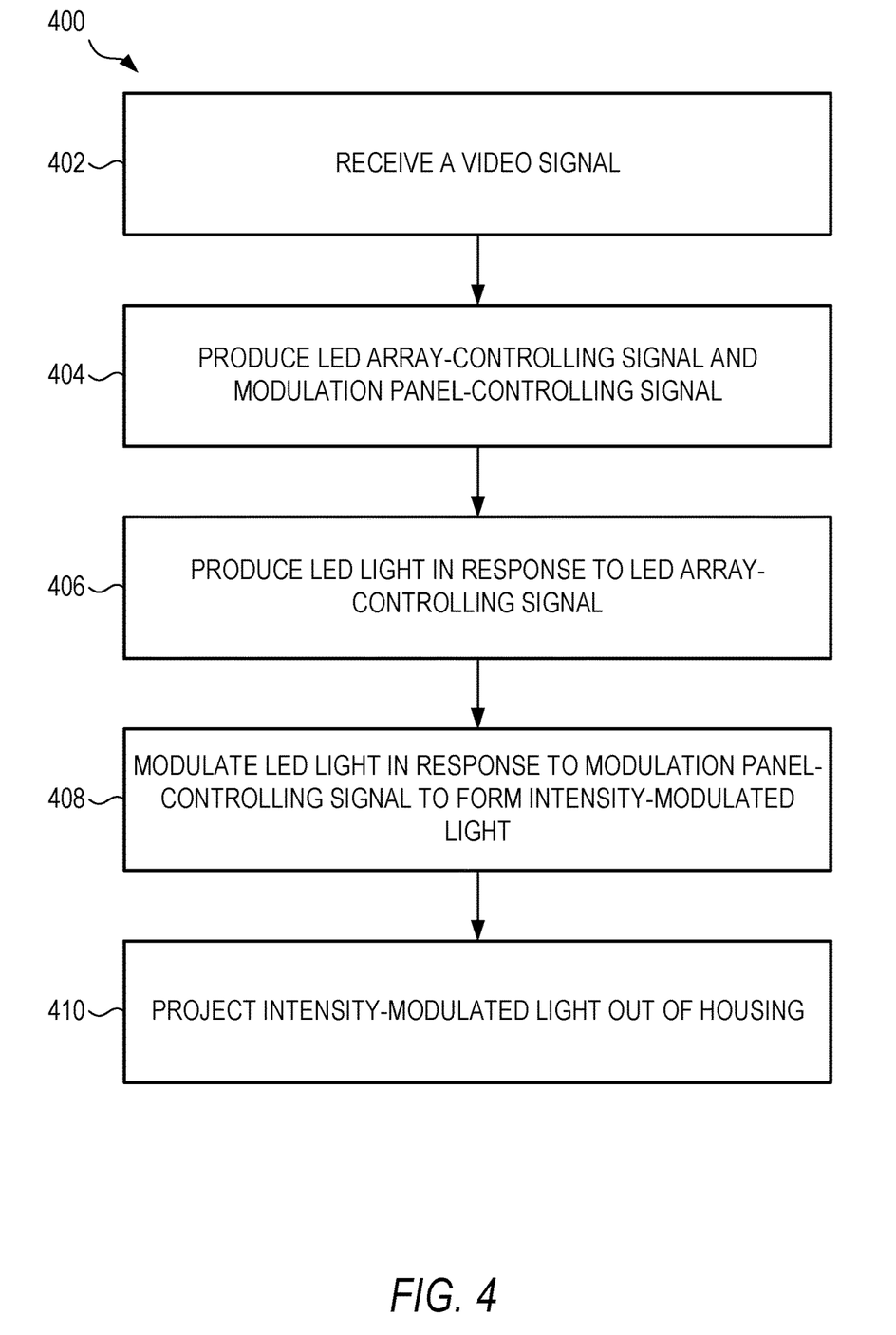
FIG. 4 shows a flowchart of an example of a method for projecting a video image, in accordance with some examples.

FIG. 4 shows a flowchart of an example of a method 400 for projecting a video image, in accordance with some examples. The method 400 can be executed by projection system 100, projection system 200, projection system 300, or another suitable system. The method 400 for projecting a video image is but one method for projecting a video image; other suitable methods can also be used.

At operation 402, a controller, disposed in a housing, can receive a video signal.

At operation 404, the controller can produce, in response to the video signal, a light-emitting diode (LED) array-controlling signal and a modulation panel-controlling signal.

At operation 406, LEDs of an LED array disposed in the housing can produce LED light having corresponding time-varying intensities in response to the LED array-controlling signal.

At operation 408, a plurality of pixels of a modulation panel disposed in the housing can modulate corresponding portions of the LED light in response to the modulation panel-controlling signal to form intensity-modulated light.

At operation 410, a lens disposed in or on the housing can project the intensity-modulated light out of the housing to form a video image that corresponds to the video signal. The video image can be located away from the housing.

The method 400 can optionally further include angularly broadening the LED light with a diffuser disposed between the LED array and the modulation panel.

The method 400 can optionally further include at least partially focusing the LED light with a lens array, the lens array including lenses in a one-to-one correspondence with the LEDs of the LED array.

In some examples, the lens can include a first lens element and a second lens element, the second lens element being spaced apart from the first element by a user-adjustable spacing. The method 400 can optionally further include adjusting a spacing between the first lens element and the second lens element to bring the video image into focus at a specified target.

Figure 6:
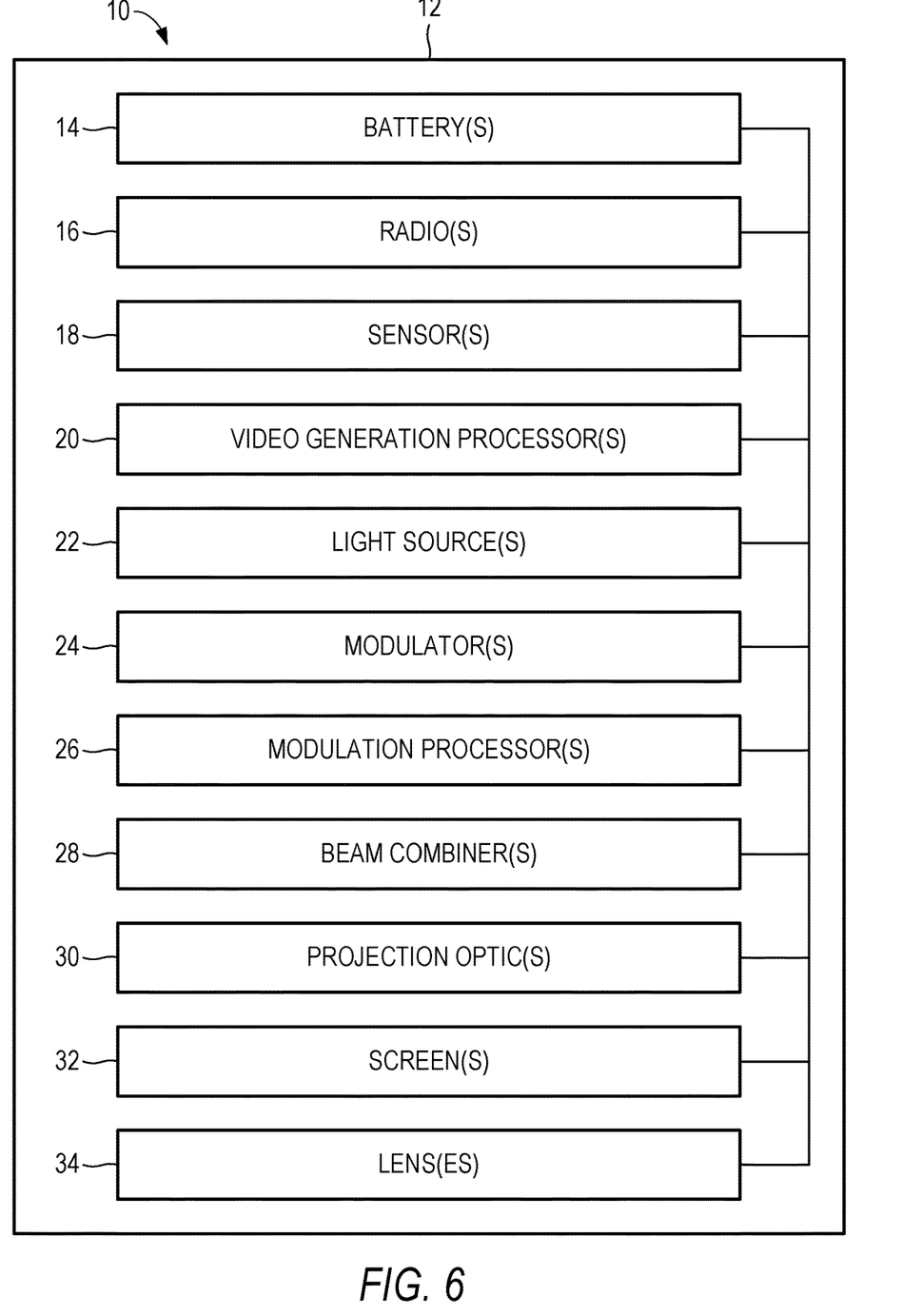
FIG. 6 shows a block diagram of an example of a visualization system.

FIG. 6 shows a block diagram of an example of a visualization system 10, such as a virtual reality headset or an augmented reality headset, that can include the projection system as described above. The visualization system 10 can include a wearable housing 12, such as a headset or goggles. The housing 12 can mechanically support and house the elements detailed below. In some examples, one or more of the elements detailed below can be included in one or more additional housings that can be separate from the wearable housing 12 and couplable to the wearable housing 12 wirelessly and/or via a wired connection. For example, a separate housing can reduce the weight of wearable goggles, such as by including batteries, radios, and other elements. The housing 12 can include one or more batteries 14, which can electrically power any or all of the elements detailed below. The housing 12 can include circuitry that can electrically couple to an external power supply, such as a wall outlet, to recharge the batteries 14. The housing 12 can include one or more radios 16 to communicate wirelessly with a server or network via a suitable protocol, such as WiFi.

The visualization system 10 can include one or more sensors 18, such as optical sensors, audio sensors, tactile sensors, thermal sensors, gyroscopic sensors, time-of-flight sensors, triangulation-based sensors, and others. In some examples, one or more of the sensors can sense a location, a position, and/or an orientation of a user. In some examples, one or more of the sensors 18 can produce a sensor signal in response to the sensed location, position, and/or orientation. The sensor signal can include sensor data that corresponds to a sensed location, position, and/or orientation. For example, the sensor data can include a depth map of the surroundings. In some examples, such as for an augmented reality system, one or more of the sensors 18 can capture a real-time video image of the surroundings proximate a user.

The visualization system 10 can include one or more video generation processors 20. The one or more video generation processors 20 can receive, from a server and/or a storage medium, scene data that represents a three-dimensional scene, such as a set of position coordinates for objects in the scene or a depth map of the scene. The one or more video generation processors 20 can receive one or more sensor signals from the one or more sensors 18. In response to the scene data, which represents the surroundings, and at least one sensor signal, which represents the location and/or orientation of the user with respect to the surroundings, the one or more video generation processors 20 can generate at least one video signal that corresponds to a view of the scene. In some examples, the one or more video generation processors 20 can generate two video signals, one for each eye of the user, that represent a view of the scene from a point of view of the left eye and the right eye of the user, respectively. In some examples, the one or more video generation processors 20 can generate more than two video signals and combine the video signals to provide one video signal for both eyes, two video signals for the two eyes, or other combinations.

The visualization system 10 can include one or more light sources 22 that can provide light for a display of the visualization system 10. Suitable light sources 22 can include a light-emitting diode, a monolithic light-emitting diode, a plurality of light-emitting diodes, an array of light-emitting diodes, an array of light-emitting diodes disposed on a common substrate, a segmented light-emitting diode that is disposed on a single substrate and has light-emitting diode elements that are individually addressable and controllable (and/or controllable in groups and/or subsets), an array of micro-light-emitting diodes (microLEDs), and others.

A light-emitting diode can be white-light light-emitting diode. For example, a white-light light-emitting diode can emit excitation light, such as blue light or violet light. The white-light light-emitting diode can include one or more phosphors that can absorb some or all of the excitation light and can, in response, emit phosphor light, such as yellow light, that has a wavelength greater than a wavelength of the excitation light.

The one or more light sources 22 can include light-producing elements having different colors or wavelengths. For example, a light source can include a red light-emitting diode that can emit red light, a green light-emitting diode that can emit green light, and a blue light-emitting diode that can emit blue right. The red, green, and blue light combine in specified ratios to produce any suitable color that is visually perceptible in a visible portion of the electromagnetic spectrum.

The visualization system 10 can include one or more modulators 24. The modulators 24 can be implemented in one of at least two configurations.

In a first configuration, the modulators 24 can include circuitry that can modulate the light sources 22 directly. For example, the light sources 22 can include an array of light-emitting diodes, and the modulators 24 can directly modulate the electrical power, electrical voltage, and/or electrical current directed to each light-emitting diode in the array to form modulated light. The modulation can be performed in an analog manner and/or a digital manner. In some examples, the light sources 22 can include an array of red light-emitting diodes, an array of green light-emitting diodes, and an array of blue light-emitting diodes, and the modulators 24 can directly modulate the red light-emitting diodes, the green light-emitting diodes, and the blue light-emitting diodes to form the modulated light to produce a specified image.

In a second configuration, the modulators 24 can include a modulation panel, such as a liquid crystal panel. The light sources 22 can produce uniform illumination, or nearly uniform illumination, to illuminate the modulation panel. The modulation panel can include pixels. Each pixel can selectively attenuate a respective portion of the modulation panel area in response to an electrical modulation signal to form the modulated light. In some examples, the modulators 24 can include multiple modulation panels that can modulate different colors of light. For example, the modulators 24 can include a red modulation panel that can attenuate red light from a red light source such as a red light-emitting diode, a green modulation panel that can attenuate green light from a green light source such as a green light-emitting diode, and a blue modulation panel that can attenuate blue light from a blue light source such as a blue light-emitting diode.

In some examples of the second configuration, the modulators 24 can receive uniform white light or nearly uniform white light from a white light source, such as a white-light light-emitting diode. The modulation panel can include wavelength-selective filters on each pixel of the modulation panel. The panel pixels can be arranged in groups (such as groups of three or four), where each group can form a pixel of a color image. For example, each group can include a panel pixel with a red color filter, a panel pixel with a green color filter, and a panel pixel with a blue color filter. Other suitable configurations can also be used.

The visualization system 10 can include one or more modulation processors 26, which can receive a video signal, such as from the one or more video generation processors 20, and, in response, can produce an electrical modulation signal. For configurations in which the modulators 24 directly modulate the light sources 22, the electrical modulation signal can drive the light sources 24. For configurations in which the modulators 24 include a modulation panel, the electrical modulation signal can drive the modulation panel.

The visualization system 10 can include one or more beam combiners 28 (also known as beam splitters 28), which can combine light beams of different colors to form a single multi-color beam. For configurations in which the light sources 22 can include multiple light-emitting diodes of different colors, the visualization system 10 can include one or more wavelength-sensitive (e.g., dichroic) beam splitters 28 that can combine the light of different colors to form a single multi-color beam.

The visualization system 10 can direct the modulated light toward the eyes of the viewer in one of at least two configurations. In a first configuration, the visualization system 10 can function as a projector, and can include suitable projection optics 30 that can project the modulated light onto one or more screens 32. The screens 32 can be located a suitable distance from an eye of the user. The visualization system 10 can optionally include one or more lenses 34 that can locate a virtual image of a screen 32 at a suitable distance from the eye, such as a close-focus distance, such as 500 mm, 750 mm, or another suitable distance. In some examples, the visualization system 10 can include a single screen 32, such that the modulated light can be directed toward both eyes of the user. In some examples, the visualization system 10 can include two screens 32, such that the modulated light from each screen 32 can be directed toward a respective eye of the user. In some examples, the visualization system 10 can include more than two screens 32. In a second configuration, the visualization system 10 can direct the modulated light directly into one or both eyes of a viewer. For example, the projection optics 30 can form an image on a retina of an eye of the user, or an image on each retina of the two eyes of the user.

For some configurations of augmented reality systems, the visualization system 10 can include an at least partially transparent display, such that a user can view the user's surroundings through the display. For such configurations, the augmented reality system can produce modulated light that corresponds to the augmentation of the surroundings, rather than the surroundings itself. For example, in the example of a retailer showing a chair, the augmented reality system can direct modulated light, corresponding to the chair but not the rest of the room, toward a screen or toward an eye of a user.

To further illustrate the systems and related methods disclosed herein, a non-limiting list of examples is provided below. Each of the following non-limiting examples can stand on its own or can be combined in any permutation or combination with any one or more of the other examples.

In Example 1, an projection system can include: a housing; a controller configured to receive a video signal and, in response to the video signal, produce a light-emitting diode (LED) array-controlling signal and a modulation panel-controlling signal; an LED array disposed in the housing and including LEDs that are configured to produce LED light having corresponding time-varying intensities in response to the LED array-controlling signal; a modulation panel disposed in the housing and having a plurality of pixels that are configured to modulate corresponding portions of the LED light in response to the modulation panel-controlling signal to form intensity-modulated light; and a lens disposed in or on the housing, the lens configured to project the intensity-modulated light from the housing to form a video image that corresponds to the video signal.

In Example 2, the projection system of Example 1 can optionally be configured such that the modulation panel comprises: a first polarizer disposed in the housing and configured to pass a single polarization component of the LED light to form polarized light; a liquid crystal panel disposed in the housing and having a plurality of pixels that are configured to controllably alter corresponding states of polarization of corresponding portions of the polarized light in response to the modulation panel-controlling signal to form polarization-modulated light; and a second polarizer disposed in the housing and configured to pass a single polarization component of the polarization-modulated light to form the intensity-modulated light.

In Example 3, the projection system of any one of Examples 1-2 can optionally be configured such that the modulation panel comprises an array of micromirrors.

In Example 4, the projection system of any one of Examples 1-3 can optionally be configured such that a number of pixels in the plurality of pixels is greater than a number of LEDs in the LED array.

In Example 5, the projection system of any one of Examples 1-4 can optionally be configured such that each LED in the LED array corresponds to a subset of pixels of the plurality of pixels.

In Example 6, the projection system of any one of Examples 1-5 can optionally be configured such that the subsets are mutually exclusive.

In Example 7, the projection system of any one of Examples 1-6 can optionally be configured such that adjacent subsets overlap at edges of the adjacent subsets.

In Example 8, the projection system of any one of Examples 1-7 can optionally be configured such that the LED array-controlling signal is configured to average the video signal over the subset of pixels.

In Example 9, the projection system of any one of Examples 1-8 can optionally be configured such that the LED array-controlling signal of each LED is configured to have an intensity value that corresponds to a maximum intensity value of the modulation panel-controlling signal for the corresponding subset of pixels.

In Example 10, the projection system of any one of Examples 1-9 can optionally further include a diffuser disposed between the LED array and the modulation panel, the diffuser configured to increase a spatial uniformity of the LED light.

In Example 11, the projection system of any one of Examples 1-10 can optionally be configured such that the LEDs of the LED array are disposed on a single substrate.

In Example 12, the projection system of any one of Examples 1-11 can optionally further include a lens array configured to at least partially focus the LED light, the lens array including lenses in a one-to-one correspondence with the LEDs of the LED array.

In Example 13, the projection system of any one of Examples 1-12 can optionally be configured such that the LEDs of the LED array are disposed on separate substrates.

In Example 14, the projection system of any one of Examples 1-13 can optionally be configured such that the lens includes a first lens element and a second lens element, the second lens element being spaced apart from the first element by a user-adjustable spacing to bring the video image into focus at a specified target.

In Example 15, the projection system of any one of Examples 1-14 can optionally be configured such that: the LED array-controlling signal is a first LED array-controlling signal; the modulation panel-controlling signal is a first modulation panel-controlling signal; the controller is further configured to produce a second LED array-controlling signal and a second modulation panel-controlling signal in response to the video signal; the intensity-modulated light is first intensity-modulated light; the LED array is a first LED array including LEDs configured to emit first LED light at a first wavelength; the modulation panel is a first modulation panel; the projection system further comprises: a second LED array disposed in the housing and including LEDs that are configured to produce second LED light having corresponding time-varying intensities in response to the second LED array-controlling signal, the second LED array configured to produce light at a different wavelength than the first LED array; a second modulation panel having a plurality of pixels that are configured to modulate corresponding portions of the second LED light in response to the second modulation panel-controlling signal to form second intensity-modulated light; and a beam combiner configured to combine the first intensity-modulated light and the second intensity-modulated light to produce wavelength-combined intensity-modulated light; and the lens is configured to project the wavelength-combined intensity-modulated light out of the housing to form the video image.

In Example 16, a method for projecting a video image can include: receiving a video signal with a controller disposed in a housing; producing, with the controller, in response to the video signal, a light-emitting diode (LED) array-controlling signal and a modulation panel-controlling signal; producing, with LEDs of an LED array disposed in the housing, LED light having corresponding time-varying intensities in response to the LED array-controlling signal; modulating, with a plurality of pixels of a modulation panel disposed in the housing, corresponding portions of the LED light in response to the modulation panel-controlling signal to form intensity-modulated light; and projecting, with a lens disposed in or on the housing, the intensity-modulated light from the housing to form a video image that corresponds to the video signal.

In Example 17, the method of Example 16 can optionally further include: increasing a spatial uniformity of the LED light with a diffuser disposed between the LED array and the modulation panel.

In Example 18, the method of any one of Examples 16-17 can optionally further include: at least partially focusing the LED light with a lens array, the lens array including lenses in a one-to-one correspondence with the LEDs of the LED array.

In Example 19, a projection system can include: a housing; a controller configured to receive a video signal and, in response to the video signal, produce a light-emitting diode (LED) array-controlling signal and a modulation panel-controlling signal; an LED array disposed in the housing and including LEDs that are configured to produce LED light having corresponding time-varying intensities in response to the LED array-controlling signal; a diffuser disposed in the housing and configured to increase a spatial uniformity of the LED light to produce diffuse LED light; a first polarizer disposed in the housing and configured to pass a single polarization component of the diffuse LED light to form polarized light; a liquid crystal panel disposed in the housing and having a plurality of pixels that are configured to controllably alter corresponding states of polarization of corresponding portions of the polarized light in response to the modulation panel-controlling signal to form polarization-modulated light; a second polarizer disposed in the housing and configured to pass a single polarization component of the polarization-modulated light to form intensity-modulated light; and a lens disposed in or on the housing, the lens configured to project the intensity-modulated light out of the housing to form a video image that corresponds to the video signal, the video image being located away from the housing, the lens including a first lens element and a second lens element, the second lens element being spaced apart from the first element by a user-adjustable spacing to bring the video image into focus at a specified target.

In Example 20, the projection system of Example 19 can optionally further include a lens array configured to at least partially focus the LED light, the lens array including lenses in a one-to-one correspondence with the LEDs of the LED array.

In Example 21, a projection system can include a processor; memory including instructions that, when executed by the processor, cause the processor to perform operations, the operations including: receiving a video signal with a controller disposed in a housing; producing, with the controller, in response to the video signal, a light-emitting diode (LED) array-controlling signal and a modulation panel-controlling signal; producing, with LEDs of an LED array disposed in the housing, LED light having corresponding time-varying intensities in response to the LED array-controlling signal; modulating, with a plurality of pixels of a modulation panel disposed in the housing, corresponding portions of the LED light in response to the modulation panel-controlling signal to form intensity-modulated light; and projecting, with a lens disposed in or on the housing, the intensity-modulated light from the housing to form a video image that corresponds to the video signal.

In Example 22, the projection system of Example 21 can optionally include the limitations of any one of Examples 1-20.

While only certain features of the system and method have been illustrated and described herein, many modifications and changes will occur to those skilled in the art. It is, therefore, to be understood that the appended claims are intended to cover all such modifications and changes. Method operations can be performed substantially simultaneously or in a different order.

What is claimed is:
1. A projection system, comprising:
a housing;
a controller configured to receive a video signal and, in response to the video signal, produce a light-emitting diode (LED) array-controlling signal and a modulation panel-controlling signal;
an LED array disposed in the housing and including LEDs that are configured to produce LED light having corresponding time-varying intensities in response to the LED array-controlling signal;
a modulation panel disposed in the housing and having a plurality of pixels that are configured to modulate corresponding portions of the LED light in response to the modulation panel-controlling signal to form intensity-modulated light; and
a lens disposed in or on the housing, the lens configured to project the intensity-modulated light from the housing to form a video image that corresponds to the video signal,
wherein:
a number of pixels in the plurality of pixels is greater than a number of LEDs in the LED array;
each LED in the LED array corresponds to a subset of pixels of the plurality of pixels; and
the subsets are mutually exclusive.

2. The projection system of claim 1, wherein the modulation panel comprises:
a first polarizer disposed in the housing and configured to pass a single polarization component of the LED light to form polarized light;
a liquid crystal panel disposed in the housing and having a plurality of pixels that are configured to controllably alter corresponding states of polarization of corresponding portions of the polarized light in response to the modulation panel-controlling signal to form polarization-modulated light; and
a second polarizer disposed in the housing and configured to pass a single polarization component of the polarization-modulated light to form the intensity-modulated light.

3. The projection system of claim 1, wherein the modulation panel comprises an array of micromirrors.

4. The projection system of claim 1, wherein adjacent subsets overlap at edges of the adjacent subsets.

5. The projection system of claim 1, wherein the LED array-controlling signal is configured to average the video signal over the subset of pixels.

6. The projection system of claim 1, wherein the LED array-controlling signal of each LED is configured to have an intensity value that corresponds to a maximum intensity value of the modulation panel-controlling signal for the corresponding subset of pixels.

7. The projection system of claim 1, further comprising a diffuser disposed between the LED array and the modulation panel, the diffuser configured to increase a spatial uniformity of the LED light.

8. The projection system of claim 1, wherein the LEDs of the LED array are disposed on a single substrate.

9. The projection system of claim 1, further comprising a lens array configured to at least partially focus the LED light, the lens array including lenses in a one-to-one correspondence with the LEDs of the LED array.

10. The projection system of claim 9, wherein the LEDs of the LED array are disposed on separate substrates.

11. The projection system of claim 1, wherein the lens includes a first lens element and a second lens element, the second lens element being spaced apart from the first lens element by a user-adjustable spacing to bring the video image into focus at a specified target.

12. The projection system of claim 1, wherein:
the LED array-controlling signal is a first LED array-controlling signal;
the modulation panel-controlling signal is a first modulation panel-controlling signal;
the controller is further configured to produce a second LED array-controlling signal and a second modulation panel-controlling signal in response to the video signal;
the intensity-modulated light is first intensity-modulated light;
the LED array is a first LED array including LEDs configured to emit first LED light at a first wavelength;
the modulation panel is a first modulation panel;
the projection system further comprises:
a second LED array disposed in the housing and including LEDs that are configured to produce second LED light having corresponding time-varying intensities in response to the second LED array-controlling signal, the second LED array configured to produce light at a different wavelength than the first LED array;

a second modulation panel having a plurality of pixels that are configured to modulate corresponding portions of the second LED light in response to the second modulation panel-controlling signal to form second intensity-modulated light; and a beam combiner configured to combine the first intensity-modulated light and the second intensity-modulated light to produce wavelength-combined intensity-modulated light; and the lens is configured to project the wavelength-combined intensity-modulated light out of the housing to form the video image.

13. A method for projecting a video image, the method comprising:

receiving a video signal with a controller disposed in a housing;

producing, with the controller, in response to the video signal, a light-emitting diode (LED) array-controlling signal and a modulation panel-controlling signal;

producing, with LEDs of an LED array disposed in the housing, LED light having corresponding time-varying intensities in response to the LED array-controlling signal;

modulating, with a plurality of pixels of a modulation panel disposed in the housing, corresponding portions of the LED light in response to the modulation panel-controlling signal to form intensity-modulated light; and projecting, with a lens disposed in or on the housing, the intensity-modulated light from the housing to form a video image that corresponds to the video signal, wherein:

a number of pixels in the plurality of pixels is greater than a number of LEDs in the LED array;

each LED in the LED array corresponds to a subset of pixels of the plurality of pixels; and the subsets are mutually exclusive.

14. The method of claim 13, further comprising:

increasing a spatial uniformity of the LED light with a diffuser disposed between the LED array and the modulation panel.

15. The method of claim 13, further comprising:

at least partially focusing the LED light with a lens array, the lens array including lenses in a one-to-one correspondence with the LEDs of the LED array.

16. A projection system, comprising:

a housing;

a controller configured to receive a video signal and, in response to the video signal, produce a light-emitting diode (LED) array-controlling signal and a modulation panel-controlling signal;

an LED array disposed in the housing and including LEDs that are configured to produce LED light having corresponding time-varying intensities in response to the LED array-controlling signal;

a diffuser disposed in the housing and configured to increase a spatial uniformity of the LED light to produce diffuse LED light;

a first polarizer disposed in the housing and configured to pass a single polarization component of the diffuse LED light to form polarized light;

a liquid crystal panel disposed in the housing and having a plurality of pixels that are configured to controllably alter corresponding states of polarization of corresponding portions of the polarized light in response to the modulation panel-controlling signal to form polarization-modulated light;

a second polarizer disposed in the housing and configured to pass a single polarization component of the polarization-modulated light to form intensity-modulated light; and a lens disposed in or on the housing, the lens configured to project the intensity-modulated light out of the housing to form a video image that corresponds to the video signal, the video image being located away from the housing, the lens including a first lens element and a second lens element, the second lens element being spaced apart from the first lens element by a user-adjustable spacing to bring the video image into focus at a specified target.

17. The projection system of claim 16, further comprising a lens array configured to at least partially focus the LED light, the lens array including lenses in a one-to-one correspondence with the LEDs of the LED array.

* * * * *